United States Patent
Nuss et al.

(10) Patent No.: US 9,856,150 B2
(45) Date of Patent: Jan. 2, 2018

(54) FILTER ASSEMBLY FOR AN APPLIANCE

(71) Applicant: General Electric Company, Schenectady, NY (US)

(72) Inventors: Bart Andrew Nuss, Fisherville, KY (US); Alan Joseph Mitchell, Louisville, KY (US)

(73) Assignee: Haier US Applicance Solutions, Inc., Wilmington, DE (US)

(*) Notice: Subject to any disclaimer, the term of this patent is extended or adjusted under 35 U.S.C. 154(b) by 392 days.

(21) Appl. No.: 14/794,940

(22) Filed: Jul. 9, 2015

(65) Prior Publication Data

US 2017/0007946 A1 Jan. 12, 2017

(51) Int. Cl.
| | |
|---|---|
| *B01D 29/92* | (2006.01) |
| *B01D 35/157* | (2006.01) |
| *C02F 1/00* | (2006.01) |
| *B01D 27/08* | (2006.01) |
| *B01D 35/30* | (2006.01) |
| *B01D 35/147* | (2006.01) |

(52) U.S. Cl.
CPC .............. *C02F 1/001* (2013.01); *B01D 27/08* (2013.01); *B01D 29/92* (2013.01); *B01D 35/147* (2013.01); *B01D 35/30* (2013.01); *B01D 2201/303* (2013.01); *C02F 1/003* (2013.01); *C02F 2307/10* (2013.01); *C02F 2307/12* (2013.01)

(58) Field of Classification Search
CPC .... B01D 35/157; B01D 35/147; B01D 35/30; B01D 27/08; B01D 29/92; B01D 2201/303; C02F 1/001; C02F 1/003; C02F 2307/10; C02F 2307/12
See application file for complete search history.

(56) References Cited

U.S. PATENT DOCUMENTS 7,387,210 B2    6/2008  Burrows et al.
9,370,737 B1 *  6/2016  Nuss ................. B01D 35/0276

* cited by examiner

*Primary Examiner* — Thomas M Lithgow
(74) *Attorney, Agent, or Firm* — Dority & Manning, P.A.

(57) ABSTRACT

A water filter assembly is provided including a body defining a body cavity, a spool slidably positioned in the body cavity, and a filter cartridge. Once the filter cartridge is inserted into the spool cavity and body cavity, the filter cartridge is configured to filter water from an inlet of the body. Additionally, the filter cartridge includes a nozzle for providing such filtered water to an outlet of the body. The nozzle includes an outlet directed back towards the filter medium such that the filter cartridge is pressed into the spool cavity and body cavity when water flows therethrough.

20 Claims, 4 Drawing Sheets

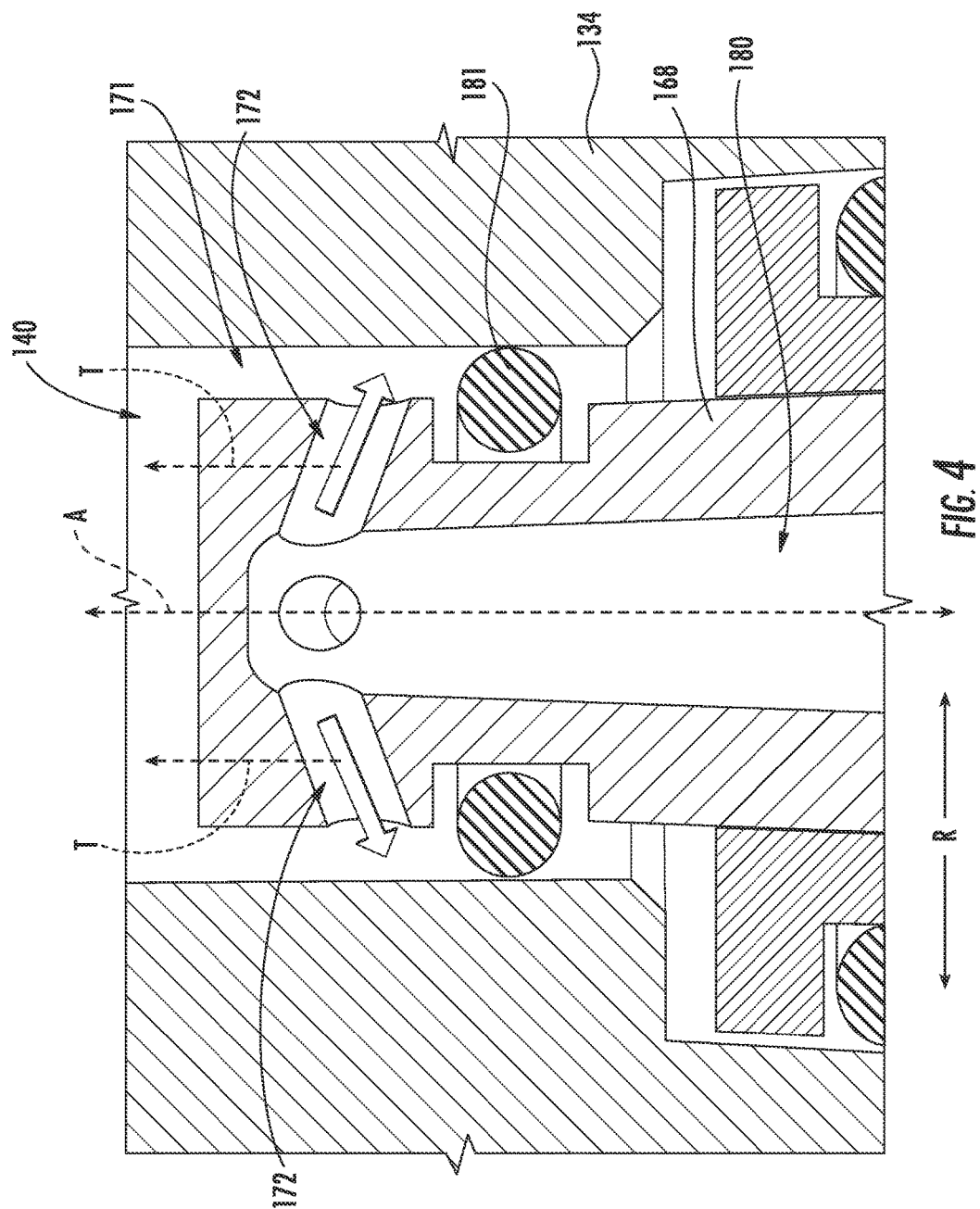

FILTER ASSEMBLY FOR AN APPLIANCE

FIELD OF THE INVENTION

The present subject matter relates generally to a water filter assembly for an appliance.

BACKGROUND OF THE INVENTION

Various consumer appliances utilize water from unfiltered water sources, including municipal water supplies. For example, refrigerators utilize water in the formation ice and in water dispensing operations. Additionally, single serve beverage dispenser appliances, including coffee maker appliances, utilize water for brewing and mixing operations. It is generally desirable to ensure that water for these various appliances is free from contaminants and other debris. To further this desire, water filter assemblies may be used in conjunction with these various appliances to provide filtered water.

Such water filter assemblies are typically integrated into the appliance and may include one or more layers of fine mesh to provide the desired filtering. Alternatively, the filter assemblies can be positioned in the fluid line leading to such appliance. However, such filter assemblies can be difficult to maintain. For example, after a certain amount of use and/or after a certain amount of time, it is generally necessary to replace or clean a filter medium of the filter assembly in order to ensure a desired amount of filtering takes place. Replacing the filter medium may be a relatively laborious activity, and may require a relatively large amount of care to be taken to ensure the replacement filter medium is properly installed. For example, certain filter mediums must be installed in a precise location and/or orientation to function properly. Additionally, in certain water filter assemblies, a relatively large amount of water pressure can build up, such that when the filter medium is removed during replacement, the filter medium is ejected at a relatively high velocity.

Accordingly, a water filter assembly with features allowing for a greater ease of installation would be useful. More particularly, a water filter assembly with features reducing a velocity at which a filter medium is ejected during removal/replacement would be particularly beneficial.

BRIEF DESCRIPTION OF THE INVENTION

Aspects and advantages of the invention will be set forth in part in the following description, or may be apparent from the description, or may be learned through practice of the invention.

In a first exemplary embodiment, a water filter assembly defining an axial ceterline is provided. The water filter assembly includes a body defining a body inlet for receiving unfiltered water, a body outlet, and a body cavity extending along the axial centerline between a first end and a second end. The water filter assembly also includes a spool defining a spool cavity, the spool slidably positioned in the body cavity along the axial centerline between a first position and a second position. The body inlet is fluidly connected through the spool cavity to the body outlet when the spool is in the first position. The filter assembly also includes a filter cartridge slidably received along the axial centerline at least partially in the body cavity into an inserted position. The filter cartridge includes a nozzle for providing filtered water to the body outlet. The nozzle includes an outlet defining an acute angle with the axial centerline such that the filter cartridge is pressed towards the inserted position when water flows therethrough.

In a second exemplary embodiment, a water filter assembly defining an axial centerline is provided. The water filter assembly includes a body defining a body inlet for receiving unfiltered water, a body outlet, and a body cavity extending along the axial centerline between a first end and a second end. The water filter assembly also includes a spool defining a spool cavity; the body inlet fluidly connected through the spool cavity to the body outlet. The water filter assembly also includes a filter cartridge including a filter medium and a nozzle, the filter cartridge slidably received in the spool cavity such that the nozzle is at least partially positioned in the spool cavity for providing filtered water to the body outlet through the spool. The nozzle includes an outlet directed back towards the filter medium such that the filter cartridge is pressed into the spool cavity when water flows therethrough.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

FIG. 4 provides a close-up, cross-sectional view of a nozzle of the filter cartridge of the exemplary water filter assembly of FIG. 1.

DETAILED DESCRIPTION

Figure 1:
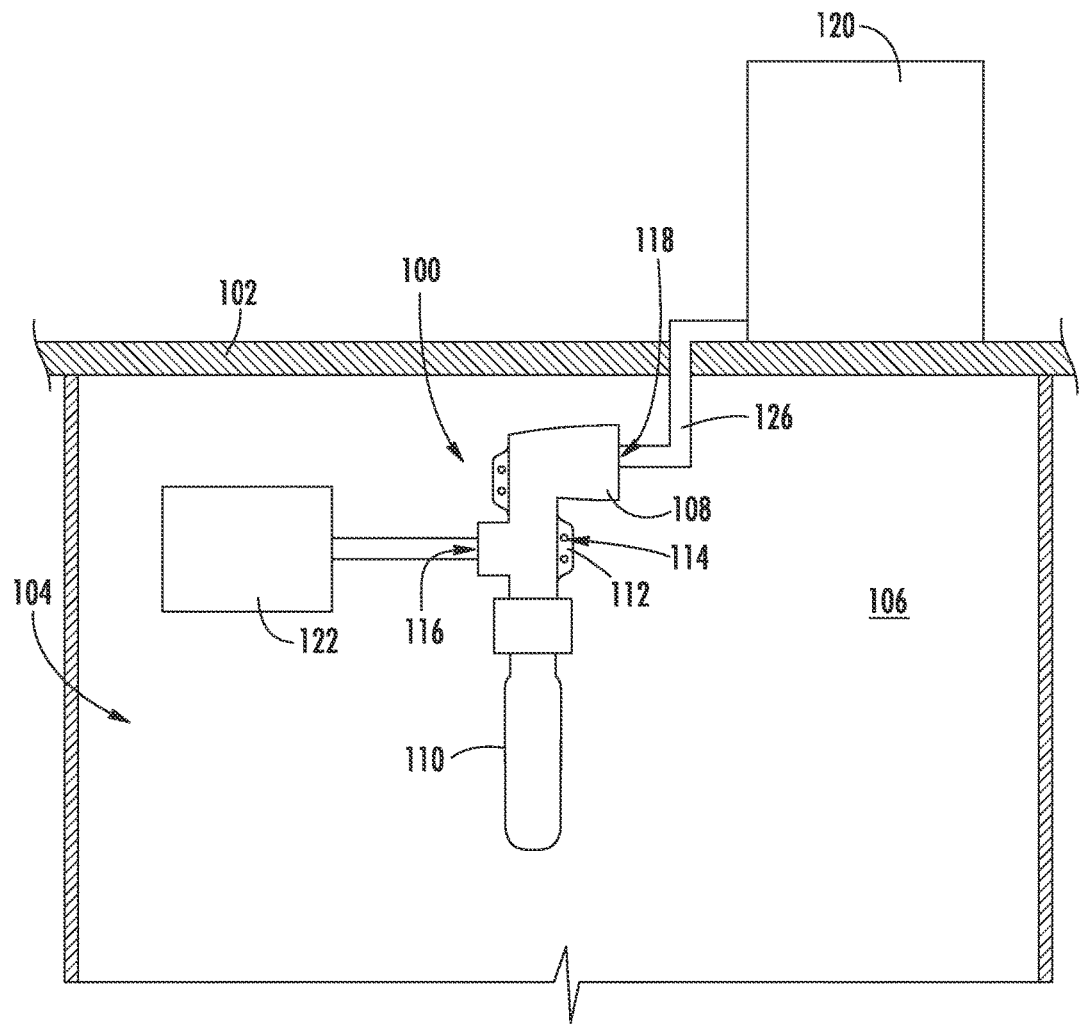
FIG. 1 provides a perspective view of a water filter assembly according to an exemplary embodiment of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 provides a perspective view of a water filter assembly 100 according to an exemplary embodiment of the present subject matter. For the embodiment of FIG. 1, the water filter assembly 100 is depicted installed below a countertop 102 (such as within a cabinet 104 and attached to a back wall 106 of the cabinet 104). However, in other embodiments, water filter assembly 100 may be positioned at any other suitable location. As will be understood by those skilled in the art and as used herein, the term "water" includes purified water and solutions or mixtures containing water and, e.g., elements (such as calcium, chlorine, and fluorine), salts, bacteria, nitrates, organics, and other chemical compounds or substances.

Water filter assembly 100 includes a body 108 and a water filter cartridge 110 removably attached to body 108 (as will be discussed below). Body 108 includes a plurality of mounting brackets 112, each defining holes 114. Fasteners (not shown) such as nails, pegs, tabs, screws, or bolts may be inserted through holes 114 to mount water filter assembly 100, e.g., to back wall 106 of kitchen cabinet 104. Mounting brackets 112 may be formed integrally with body 108, or alternatively may be separate components attached to body 108 in any suitable manner. Additionally, body 108 may be formed of any suitable material and in any suitable manner. For example, body 108 may be cast from aluminum or stainless steel, or alternatively may be molded from a suitable plastic material.

Body 108 further defines a body inlet 116 for receiving unfiltered water and a body outlet 118 for providing filtered water to, e.g., an appliance 120. More particularly, for the embodiment depicted, body inlet 116 is fluidly connected to an unfiltered water source 122, such as a residential or commercial building plumbing system, via a conduit 124. From body inlet 116, the unfiltered water is directed into and through water filter cartridge 110, emerging as filtered water at body outlet 118. The filtered water then flows from body outlet 118 through a conduit 126 wherein the filtered water may be provided to appliance 120, such as a single serve beverage dispenser appliance, such as a countertop coffeemaker, or alternatively to a refrigerator. In other embodiments, however, the filtered water may be provided directly to a consumer water source, such as a sink faucet or other filtered water dispenser. Additionally, or alternatively, filtered water may be provided via conduit 126 to one or more other suitable appliances or locations. For example, in other exemplary embodiments, filter assembly 100 may be used in as a point of entry filtration device for an entire building.

Figure 2:
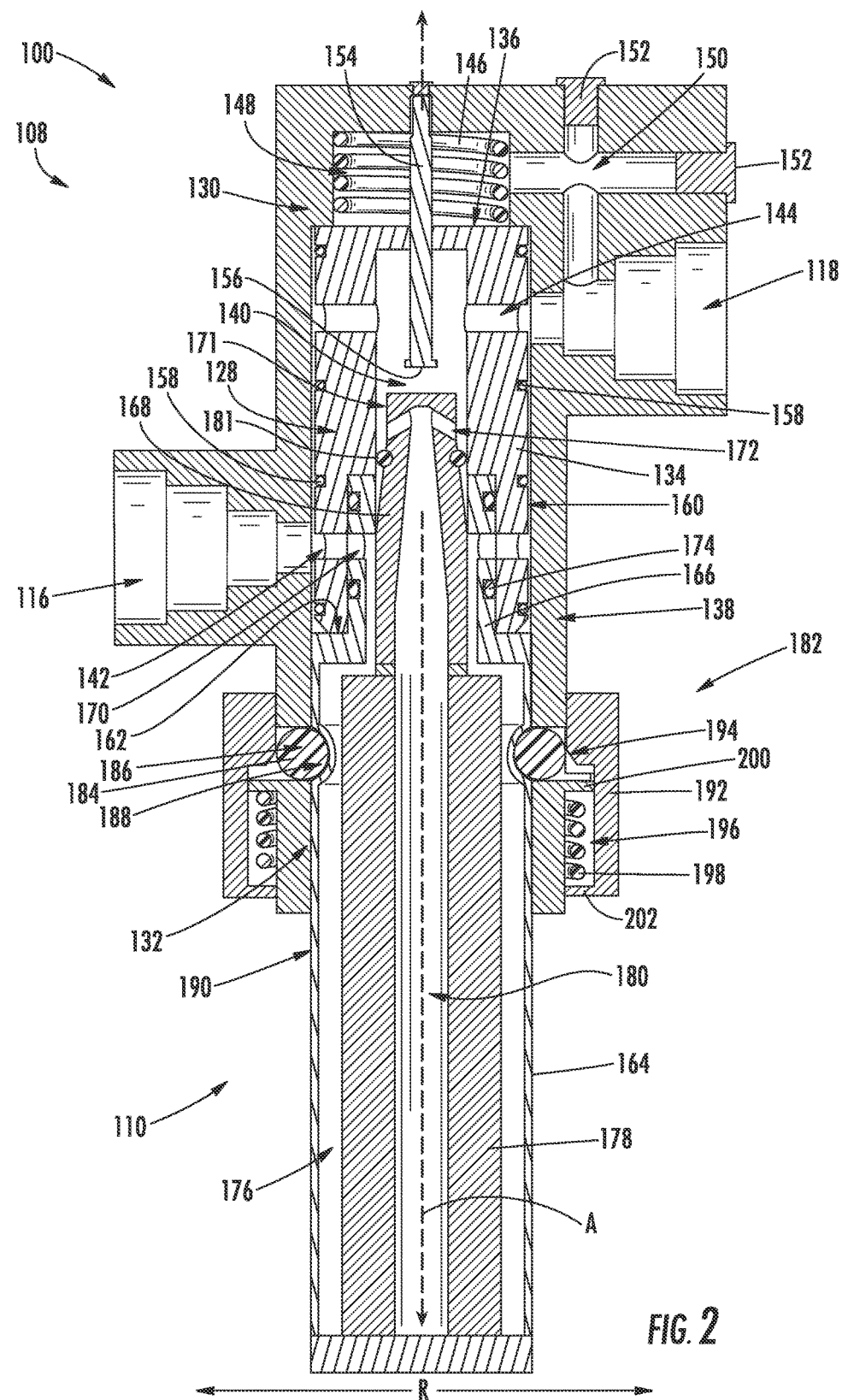
FIG. 2 provides a side cross-sectional view of the exemplary water filter assembly of FIG. 1, with a filter cartridge installed.
Figure 3:
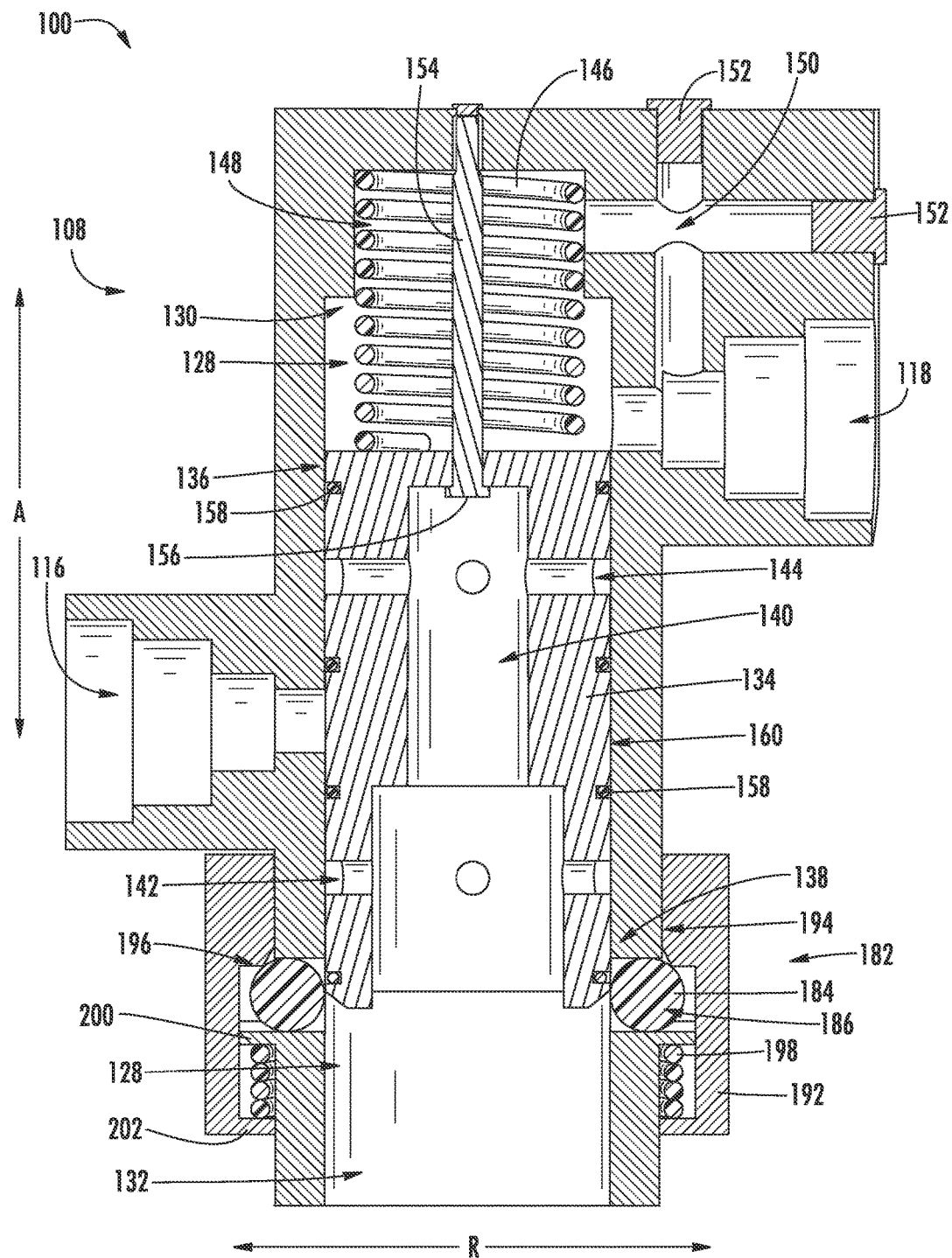
FIG. 3 provides a side cross-sectional view of the exemplary water filter assembly of FIG. 1, with the filter cartridge removed.

Referring now to FIGS. 2 and 3, side cross-sectional views are provided of the exemplary water filter assembly 100 of FIG. 1. More particularly, FIG. 2 provides a side cross-sectional view of the exemplary water filter assembly 100 of FIG. 1 with a filter cartridge 110 installed. By contrast, FIG. 3 provides a side cross-sectional view of the exemplary water filter assembly 100 of FIG. 1 with the filter cartridge 110 removed.

For the embodiment depicted, water filter assembly 100 generally defines an axial centerline A and a radial direction R. In certain embodiments, the axial centerline may be parallel to a vertical direction. As shown, body 108 of water filter assembly 100, in addition to body inlet 116 and body outlet 118, also defines a body cavity 128 extending along the axial centerline A between a first end 130 and a second end 132. The body cavity 128 is configured to receive at least a portion of filter cartridge 110 at second end 132 (FIG. 2).

A spool 134 is slidably positioned in the body cavity 128 along the axial centerline A between a first position, or retracted position (FIG. 2), and a second position, or extended position (FIG. 3). For the embodiment depicted, body cavity 128 defines a circular cross-sectional shape in the radial direction R, and spool 134 also defines a corresponding circular cross-sectional shape in the radial direction R. However, in other embodiments, body cavity 128 and spool 134 may alternatively define any other cross-sectional shape allowing for spool 134 to slide along the axial centerline A between the extended and retracted positions.

Additionally, spool 134 defines a first end 136 and a second end 138 along the axial centerline A, and a spool cavity 140 that extends generally between the first and second ends 136, 138 along the axial centerline A. Moreover, spool 134 defines a spool inlet 142 and a spool outlet 144. As shown in FIG. 2, when spool 134 is in the retracted position, body inlet 116 of body 108 is fluidly connected to body outlet 118 of body 108 through spool 134. More particularly, when spool 134 is in the retracted position, spool inlet 142 is aligned with body inlet 116 and spool outlet 144 is aligned with body outlet 118, and spool cavity 140 provides for fluid communication between body inlet 116 and body outlet 118 via spool cavity 140 and filter cartridge 110 (discussed below).

By contrast, as is shown in FIG. 3, when spool 134 is in the extended position, spool 134 blocks fluid connection between body inlet 116 of body 108 and body outlet 118 of body 108. More particularly, when spool 134 is in the extended position, spool inlet 142 is misaligned with body inlet 116 and spool outlet 144 is misaligned with body outlet 118. Notably, for the embodiment depicted, spool inlet 142 and spool outlet 144 include a plurality of cross-drilled holes. Such a configuration may allow spool inlet 142 to align with body inlet 116 and spool outlet 144 to align with body outlet 118 when spool 134 is in the retracted position regardless of an angular orientation of spool 134 about the axial centerline A relative to body 108 (i.e., a circumferential position of the spool 134 about the axial centerline A relative to the body 108).

For the exemplary embodiment depicted, spool 134 is biased towards the extended position. More particularly, exemplary water filter assembly 100 of FIGS. 2 and 3 includes a spring 146 positioned in body cavity 128 at first end 130 of body cavity 128. Spring 146 is positioned in an upper chamber 148 of body cavity 128 and extends along body cavity 128 between body 108 and first end 136 of spool 134. Moreover, as is depicted, spring 146 contacts first end 136 of spool 134 and biases spool 134 towards the extended position. Notably, body 108 further defines a bypass passage 150 extending between upper chamber 148 of body cavity 128 and body outlet 118. Bypass passage 150 allows for insertion of filter cartridge 110 and for moving of spool 134 from the second position to the first position with less hydraulic resistance (i.e., bypass passage 150 allows water in upper chamber 148 to escape to body outlet 118). Although bypass passage 150 is depicted extending all the way through body 108 with plugs 152 provided to seal bypass passage 150, such a configuration is simply for ease of manufacture. In other embodiments, bypass passage 150 may extend only between upper chamber 148 of body cavity 128 and body outlet 118.

Moreover, filter assembly 100 additionally includes a pin 154 attached to body 108 and extending along the axial centerline A. Pin 154 extends along body cavity 128 from first end 130 of body cavity 128 to and through first end 136 of spool 134 into spool cavity 140. Moreover, pin 154 includes a head 156 at a distal end positioned within spool cavity 140. Head 156 of pin 154 is configured to prevent the spool 134 from leaving the body cavity 128. More particularly, a length of pin 154 and positioning of head 156 within spool cavity 140 defines an amount of travel allowed for spool 134 within the body cavity 128 and sets the location of spool 134 when spool 134 is in the extended position.

A plurality of seals 158 are also included to assist in providing proper fluid connection, or lack thereof, between body inlet 116 and spool inlet 142 and body outlet 118 and spool outlet 144. More particularly, spool 134 includes a plurality of seals 158 extending around an outer surface 160 of spool 134 at opposing sides along the axial centerline A of spool inlet 142 and also includes a plurality seals 158 at opposing sides along the axial centerline A of spool outlet 144. For the embodiment depicted, the seals 158 are configured as O-ring seals positioned in annular indentations in outer surface 160 of spool 134. However, in other embodiments, any other suitable seals may be provided and any other configuration for seals 158 may be provided.

Referring still to FIGS. 2 and 3, filter cartridge 110 is slidably received along the axial centerline A at least partially in the body cavity 128 into an inserted position (pictured in FIG. 2). As depicted, a ledge 162 extending inwardly along the radial direction R from a base portion 164 of filter cartridge 110 holds the spool 134 in the retracted position when filter cartridge 110 is in the inserted position (FIG. 2). Further, in addition to base portion 164, filter cartridge 110 also includes a neck 166 and an extension 168. Neck 166 and extension 168 are received into body cavity 128 and are also received into spool cavity 140. Moreover, neck 166 defines a filter inlet 170, which when filter cartridge 110 is in the inserted position aligns with body inlet 116 and spool inlet 142, such that filter inlet 170 is fluidly connected to body inlet 116. Neck seals 174 are included extending circumferentially around neck 166 and positioned in annular grooves of neck 166 on opposing sides of filter inlet 170 along the axial centerline A. Accordingly, neck seals 174 may ensure proper fluid communication between spool inlet 142 and filter inlet 170. Neck seals 174 may be O-ring seals, or alternatively may be any other suitable seal.

From filter inlet 170, unfiltered water may travel into an annular space 176 in base portion 164 of filter cartridge 110 and through a filter medium 178 positioned in base portion 164 of filter cartridge 110. Filter medium 178 may be any suitable filter medium 178 for reducing impurities and/or contaminants in water passing therethrough. For example, in certain embodiments, filter medium 178 may include one or more of activated carbon, one or more stages of fine mesh, and/or any other suitable material. Such filtering can improve taste and/or reduce contaminants in water and/or remove other compounds as desired by an end user.

After passing through filter medium 178 (i.e., being "filtered"), water may travel up a central opening 180 of filter cartridge 110, the central opening 180 extending through neck 166 and extension 168, to a nozzle 171 having a plurality of filter outlets 172 and spool outlet 144. Extension 168 also includes extension seals 181 positioned adjacent filter outlets 172 of nozzle 171 along the axial centerline A towards filter medium 178 to ensure proper fluid communication between filter outlet 172 and spool outlet 144. Extension seals 181 may be O-ring seals, or alternatively may be any other suitable form of seal. From spool outlet 144, such filtered water is provided to body outlet 118, provided filter cartridge 110 is in the inserted position and spool 134 is in the first position.

Referring particularly to FIG. 2, as well as briefly to FIG. 4, providing a close-up view of the exemplary nozzle 171 of FIG. 2, the plurality of filter outlets 172 define an acute angle with the axial centerline A. More particularly, the plurality of filter outlets 172 define an acute angle with the axial centerline A as viewed along the axial centerline A from the filter medium 178. Accordingly, the plurality of filter outlets 172 depicted are directed back towards the filter medium 178. Such a configuration may ensure the filter cartridge 110 is pressed into body cavity 128 and spool cavity 140 when water flows therethrough. More particularly, an amount of thrust T is generated in a direction in which water flows through the plurality of outlets 172, which given the orientation of the outlets 172, means that the amount of thrust T generated by water flowing through the outlets 172 presses the filter cartridge 110 into the spool cavity 140 and body cavity 128. Such a configuration may reduce a velocity at which the filter cartridge is ejected during removal/replacement of the filter cartridge 110.

Referring again to FIGS. 2 and 3, filter assembly 100 further includes a locking mechanism 182 positioned at second end 130 of body cavity 128 configured to hold filter cartridge 110 in the inserted position (and thus hold spool 134 in the retracted position). For the embodiment depicted, locking mechanism 182 includes one or more locking members 184 extending through the respective openings 186 in body 108 and movable generally along the radial direction R between a radially inner locked position (FIG. 2) and a radially outer unlocked position (FIG. 3). Moreover, as is depicted, filter cartridge 110 defines an annular indentation 188 in an outer surface 190 of base portion 164 of filter cartridge 110. The one or more locking members 184 are configured to extend at least partially into the annular indentation 188 of filter cartridge 110 when filter cartridge 110 is in the inserted position and the one or more locking members 184 are in the inner locked position. Such a configuration may hold filter cartridge 110 in the inserted position during, e.g., operation of filter assembly 100.

Moreover, locking mechanism 182 also includes a sleeve 192 slidable along the body 108 between a forward position (FIG. 2) and a rear position (FIG. 3). Sleeve 192 extends around the one or more locking members 184 and includes a ramp/locking surface 194 having a close tolerance with outer surface 190 along the radial direction R. Surface 194 of sleeve 192 is configured to press the one or more locking members 184 inwardly along the radial direction R when sleeve 192 is in the forward position. More particularly, sleeve 192 is configured to hold the one or more locking members 184 in the inner locked position when sleeve 192 is in the forward position. By contrast, however, when sleeve 192 is in the rear position, the one or more locking members 184 may move radially outwardly into an annular chamber 196 defined by sleeve 192 such that filter cartridge 110 may be moved along the axial centerline A out of body cavity 128 of body 108.

For the embodiment depicted, the one or more locking members 184 are retaining balls extending through the respective openings 186 in body 108. However, in other embodiments, the one or more locking members 184 may have any other suitable shape for moving between the inner locked position and the outer unlocked position.

Moreover, the locking mechanism 182 further includes a biasing member configured to bias sleeve 192 towards the forward position. Such a configuration may ensure locking mechanism 182 is held in a locked position until, e.g., sleeve 192 is manually moved to an unlocked position by a user. For the embodiment depicted, the biasing member is a spring 198 extending around the body 108 and along the axial centerline A between a body flange 200 on body 108 and a sleeve flange 202 on sleeve 192. Body flange 200 extends outwardly along the radial direction R and sleeve flange 202 extends inwardly along the radial direction R. However, in other exemplary embodiments, any other suitable biasing member may be provided, or alternatively, no biasing member may be provided.

Referring now particularly to FIG. 2, as previously stated, the filter cartridge 110 is shown in the inserted position held in place by locking mechanism 182. More particularly, filter cartridge 110 is held in the inserted position by the one or more locking members 184 extending through the respective openings in body 108 and at least partially into annular indentation 188 defined in outer surface 190 of base portion 164 of filter cartridge 110. Additionally, sleeve 192 is in the forward position (biased in such a position by spring 198) and thus is holding the one or more locking members 184 in the inner locked position.

As filter cartridge 110 is in the inserted position, spool 134 is held in the retracted position (by ledge 162 of filter cartridge 110) and unfiltered water may flow through body inlet 116, into spool inlet 142, and into filter inlet 170. From filter inlet 170, the unfiltered water may flow down annular space 176 in base portion 164 of filter cartridge 110 and into and through filter medium 178. After having been filtered by filter medium 178, such filtered water may flow up through central opening 180 of filter cartridge 110—extending through neck 166 and extension 168 of filter cartridge 110—to spool outlet 144 and body outlet 118. From body outlet 118, the filtered water may be provided to, e.g., any suitable appliance 120.

By contrast, referring now particularly to FIG. 3, filter assembly 100 is depicted with filter cartridge 110 removed. Filter cartridge 110 may be removed by moving sleeve 192 of locking mechanism 182 to the rear position. Once in the rear position, spring 146 may press spool 134 towards the extended position, moving the one or more locking members 184 of locking mechanism 182 to the outer unlocked position and automatically ejecting the filter cartridge 110. Notably, when spool 134 is in the second position, second end 138 of spool 134 contacts the one or more locking members 184 to maintain the one or more locking members 184 in the outer unlocked position. Such a configuration leaves the filter assembly 100 "cocked" and ready to receive a subsequent filter cartridge 110. More particularly, such configuration maintains the one or more locking members 184 of locking mechanism 182 in the outer unlocked position such that installation of a subsequent filter cartridge 110 in body 108 does not require manually moving locking mechanism 182 into an unlocked position, or forcing the one or more locking members 184 to the outer unlocked position during installation.

Moreover, the configuration of filter assembly 100, or more particularly, the configuration of body 108, spool 134, filter cartridge 110, and locking mechanism 182 allows for installation of filter cartridge 110 at any angular orientation along axial centerline A relative to body 108 and/or spool 134 (i.e., filter cartridge 110 may be positioned at any circumferential position relative to axial centerline A).

Accordingly, a filter assembly 100 in accordance with an exemplary embodiment of the present disclosure may allow for increased ease of removal, installation, and/or reinstallation of one or more filter cartridges 110.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A water filter assembly defining an axial ceterline, the water filter assembly comprising:
   a body defining a body inlet for receiving unfiltered water, a body outlet, and a body cavity extending along the axial centerline between a first end and a second end;
   a spool defining a spool cavity, the spool slidably positioned in the body cavity along the axial centerline between a first position and a second position, the body inlet fluidly connected through the spool cavity to the body outlet when the spool is in the first position;
   a filter cartridge slidably received along the axial centerline at least partially in the body cavity into an inserted position and including a nozzle for providing filtered water to the body outlet, the nozzle including an outlet defining an acute angle with the axial centerline such that the filter cartridge is pressed towards the inserted position when water flows therethrough.

2. The water filter assembly of claim 1, wherein the nozzle includes a plurality of outlets, each outlet defining an acute angle with the axial centerline.

3. The water filter assembly of claim 1, wherein the spool blocks a fluid connection between the body inlet and the body outlet when the spool is in the second position.

4. The water filter assembly of claim 1, wherein the filter cartridge holds the spool in the first position when the filter cartridge is in the inserted position.

5. The water filter assembly of claim 1, wherein the spool is biased towards the second position.

6. The water filter assembly of claim 5, further comprising a spring positioned in the body cavity adjacent to the first end of the spool to bias the spool towards the second position.

7. The water filter assembly of claim 1, wherein the spool defines a spool inlet and a spool outlet, wherein when the spool is in the first position the spool inlet is aligned with the body inlet and the spool outlet is aligned with the body outlet.

8. The water filter assembly of claim 7, wherein the spool defines a plurality of seals extending around an outer surface of the spool at opposing sides along the axial centerline of the spool inlet and at opposing sides along the axial centerline of the spool outlet.

9. The water filter assembly of claim 1, further comprising a locking mechanism positioned around the second end of the body cavity configured to hold the filter cartridge in the inserted position.

10. The water filter assembly of claim 9, wherein the filter assembly further defines a radial direction, wherein the filter cartridge defines an annular indentation in an outer surface of the filter cartridge, wherein the locking mechanism includes one or more locking members moveable generally along the radial direction between an inner locked position and an outer unlocked position, and wherein the one or more locking members extend at least partially into the annular indentation of the filter cartridge when the filter cartridge is in the inserted position and the one or more locking members are in the inner locked position to hold the filter cartridge in the inserted position.

11. The water filter assembly of claim 10, wherein the locking mechanism further includes a sleeve slidable along the body between a forward position and a rear position, the sleeve configured to hold the one or more locking members in the inner locked position when the sleeve is in the forward position.

12. The water filter assembly of claim 11, wherein the locking mechanism further includes a biasing member configured to bias the sleeve towards the forward position.

13. The water filter assembly of claim 10, wherein the second end of the spool contacts the one or more locking members to maintain the one or more locking members in the outer unlocked position when the spool is in the second position.

14. The water filter assembly of claim 1, wherein the filter assembly further includes a pin attached to the body and extending along the axial centerline through the first end of the spool, wherein the pin includes a head at a distal end positioned within the spool cavity and configured to prevent the spool from leaving the body cavity.

15. A water filter assembly defining an axial centerline, the water filter assembly comprising:
   a body defining a body inlet for receiving unfiltered water, a body outlet, and a body cavity extending along the axial centerline between a first end and a second end;
   a spool defining a spool cavity, the body inlet fluidly connected through the spool cavity to the body outlet; and
   a filter cartridge including a filter medium and a nozzle, the filter cartridge slidably received in the spool cavity such that the nozzle is at least partially positioned in the spool cavity for providing filtered water to the body outlet through the spool, the nozzle including an outlet directed back towards the filter medium such that the filter cartridge is pressed into the spool cavity when water flows therethrough.

16. The water filter assembly of claim 15, the nozzle includes a plurality of outlets, each outlet directed back towards the filter medium.

17. The water filter assembly of claim 15, wherein the spool is slidably positioned in the body cavity along the axial centerline between a first position and a second position, wherein the body inlet is fluidly connected through the spool cavity to the body outlet when the spool is in the first position, and wherein the filter cartridge holds the spool in the first position when the filter cartridge is in the inserted position.

18. The water filter assembly of claim 17, wherein the spool defines a spool inlet and a spool outlet, wherein when the spool is in the first position the spool inlet is aligned with the body inlet and the spool outlet is aligned with the body outlet.

19. The water filter assembly of claim 15, further comprising
   a locking mechanism positioned around the second end of the body cavity configured to hold the filter cartridge in an inserted position.

20. The water filter assembly of claim 15, wherein the filter assembly further includes a pin attached to the body and extending along the axial centerline through the first end of the spool, wherein the pin includes a head at a distal end positioned within the spool cavity and configured to prevent the spool from leaving the body cavity.

* * * * *